Oct. 22, 1940.　　　　　F. R. SCHAEFER　　　　　2,219,166
DRYING MACHINE FOR CYLINDRICAL ARTICLES
Filed June 26, 1939　　　2 Sheets-Sheet 1

INVENTOR.
FREDERICK R. SCHAEFER
BY Richey & Watts
ATTORNEYS

Patented Oct. 22, 1940

2,219,166

UNITED STATES PATENT OFFICE 2,219,166

DRYING MACHINE FOR CYLINDRICAL ARTICLES

Frederick R. Schaefer, Youngstown, Ohio, assignor to Republic Steel Corporation, Cleveland, Ohio, a corporation of New Jersey Application June 26, 1939, Serial No. 281,177

8 Claims. (Cl. 34—12)

This invention relates to the art of coating hollow cylindrical articles. It is more particularly concerned with a conveyor for transporting drums, barrels, pails and similar articles thru an oven or furnace while rotating them so as to distribute thereon coating material which is being dried, baked or fired.

In the drawings accompanying and forming a part of this specification:

Figure 1:
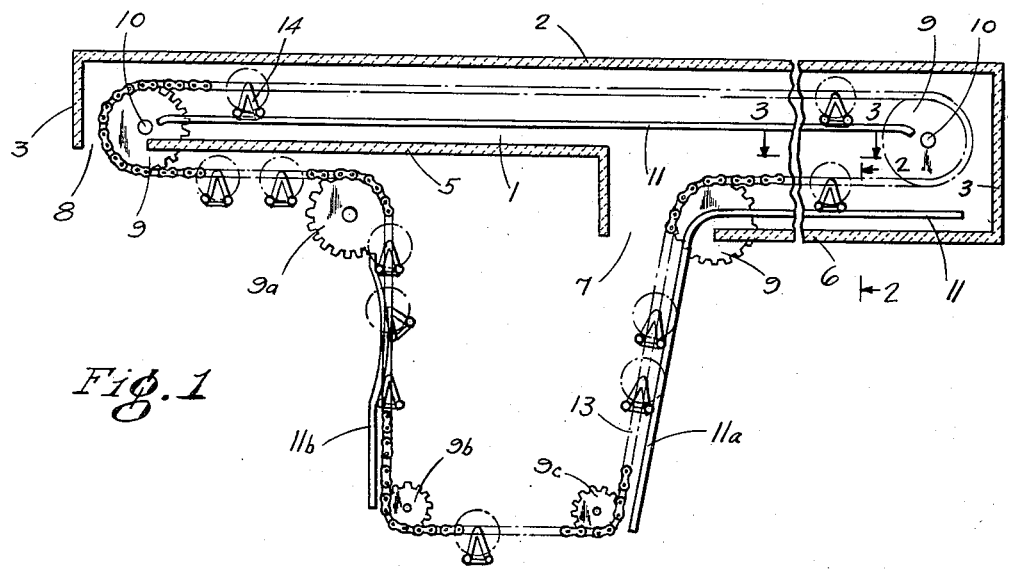
Figure 1 is a fragmentary, vertical view, partly in section, showing one form of apparatus embodying the present invention.

The heating chamber 1 is defined by a top wall 2, end walls 3, side walls 4 and bottom walls 5 and 6, the latter walls having inlet opening 7 and outlet opening 8 therethru.

Wheels 9, some of which are driven, serve to define a course of travel for a conveyor presently to be described. Certain of the wheels 9 are disposed within the heating chamber, as indicated, while others such as 9a, 9b and 9c, are disposed outside the oven. When the conveyor is in the form of opposed chains, the wheels 9 are arranged in pairs and are preferably sprocket wheels with teeth disposed to engage the links of the chains. The wheels in the heating chamber are rotatably mounted on short shafts 10 preferably supported by the side walls 4. Supporting rails 11 are disposed along the side walls 4 of the oven 1 and are, preferably, supported by angle irons 12 projecting into the chamber from side walls 4. Similar rails 11a extend up from wheels 9c into the chamber 1. These rails are inclined at a small angle to the vertical. Similar rails 11b below wheels 9a are substantially vertical except near their upper ends where they are bent and bowed laterally. All these rails are parallel to the adjacent part of the conveyor.

The illustrated conveyor consists of two opposed, endless, chain conveyors 13 which are associated with the opposed wheels 9. As will be noted in Fig. 1, the chains 13 extend thru bottom opening 7 of the chamber 1, over the wheels adjacent thereto, around corresponding wheels at the right hand end of the chamber, around the wheels at the outlet opening 8, thru said opening and over wheels 9a, under wheels 9b and 9c, and to wheel 9 at the inlet opening 7. When the chains are driven, as by rotation of one set of wheesls 9, the conveyor chains will move around the course just described.

At properly spaced intervals along chains 13 are disposed suitable article carrying devices on cradles. Since these cradles are all alike, a description of one cradle will suffice. Each cradle consists of opposed triangular shaped brackets 14 which are pivotally attached by pins 15 to links of the chains 13 and which are composed of two inclined legs and a horizontal member. The latter members are connected together, as by angles 16, so that the brackets 14 and angles 16 comprise a unit which can swing about pins 15 between chains 13 and assume different positions relative to the chains, as are indicated in Fig. 1. The chains 13 serve to propel the cradles and articles thereon and to support part of or all their weight, depending on whether or not part of such weight is supported by the rails 11, 11a and 11b.

Each leg of the brackets 14 has a short shaft 17 rotatably mounted therein. Rollers 18 are pinned to the outer ends of shafts 17 and are positioned to run on the rails 11, 11a and 11b and to support part or most of the weight of the cradles and the articles carried thereon. The inner ends of the opposed shafts 17 are connected together by parallel cylindrical members 19, which may be tubes, and the two members 19 of each cradle serve as supports on which the articles to be carried are disposed and by which the articles may be rotated. Where the rails are substantially horizontal, as in chamber 1, the rails engage all the rollers of each cradle thereabove and support much of the weight of the cradles and articles on them.

Figure 3:
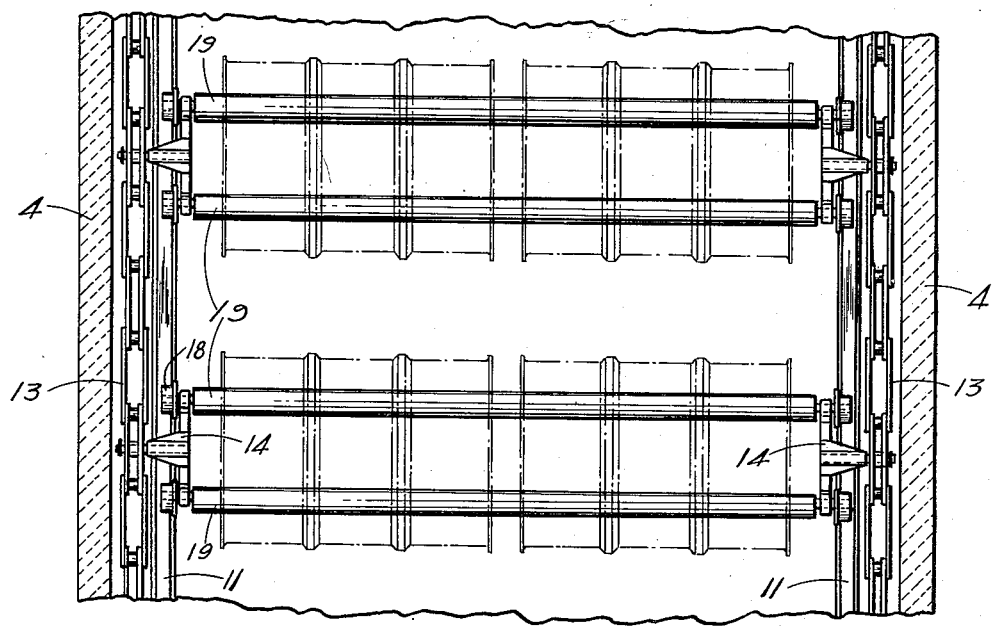
Fig. 3 is a fragmentary, top plan view, partly in section, taken on line 3—3 of Fig. 1.
Figure 2:
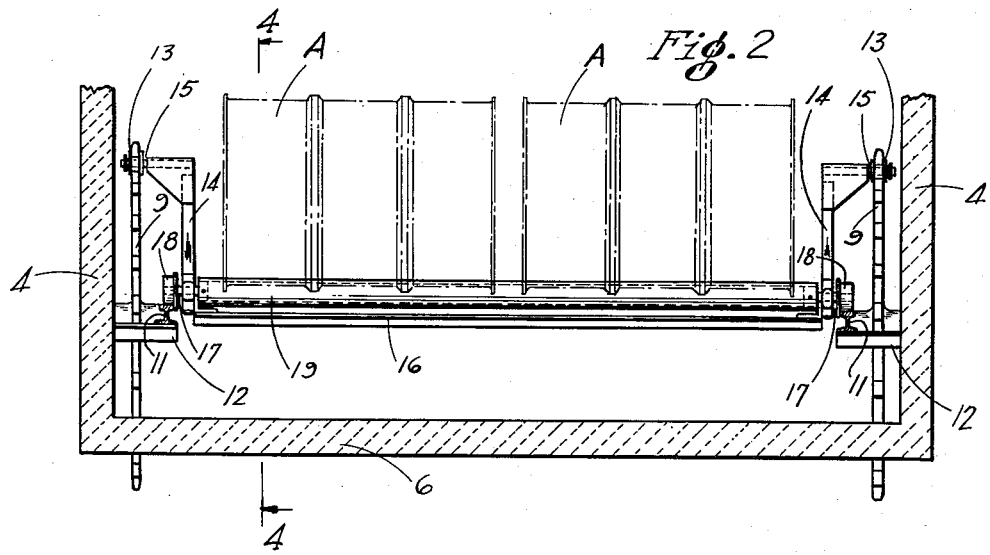
Fig. 2 is a fragmentary, transverse, sectional view, partly in elevation, taken on line 2—2 of Fig. 1.

It will be noted that in Figs. 2 and 3 two barrels are disposed on each cradle. These articles may be placed on the cradle by rolling them into position from a loading station (not shown) below the inlet opening 7 to the oven.

The angularity of rails 11a is such that the articles will be retained on their cradles and rotated as they are carried up into the chamber 1. Similarly, these barrels may be automatically unloaded from the cradles as the latter are pivoted by bowed rails 11b to such a position that the articles will roll therefrom onto an unloading platform (not shown).

Figure 4:
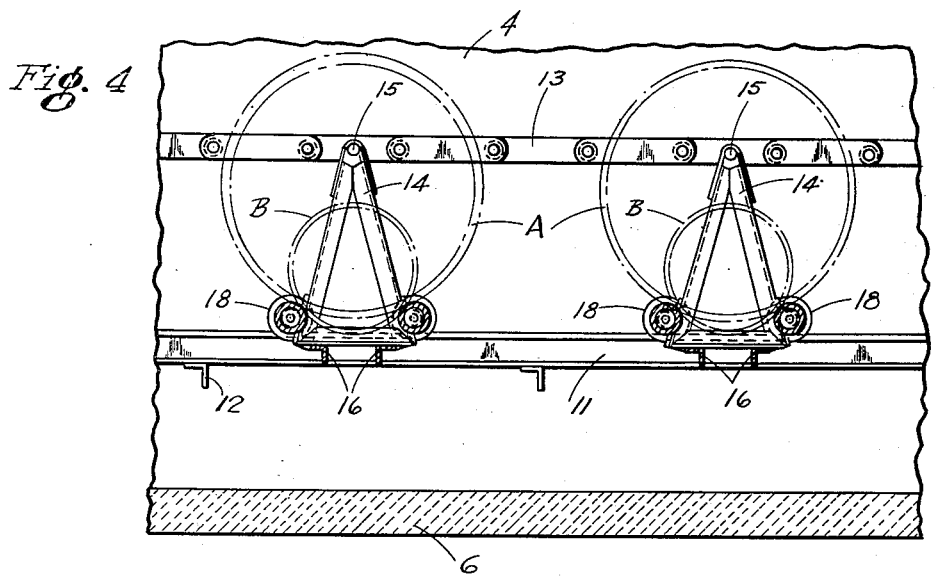
Fig. 4 is a fragmentary, vertical, longitudinal, sectional view, partly in elevation, taken on line 4—4 of Fig. 2.

As is indicated in Fig. 4, articles A of large diameter, such as barrels, as well as articles B of small diameter, such as pails, may be handled by the cradles herein illustrated. In general, it may be said that with any given spacing between members 19 a wide variety of sizes of articles may be carried by the cradles, and that an even greater range of sizes of articles may be carried by varying the distance between the members 19.

It has been found that the present invention is particularly advantageous in distributing liquid coating material such as paint, lacquer and the like on hollow cylindrical articles while the coating is being dried, baked or fired. If such articles, after being coated with liquid coating material, are placed on the moving cradles, the articles will be constantly rotated and the coating material thereon will be continually distributed over the surfaces of the articles while it is being dried, baked or fired.

Altho I have illustrated herein smooth topped rails 11 and smooth faced rollers 18 to run thereon, it will be understood that if and when it is desirable to do so toothed or serrated rails may be substituted for the smooth surfaced rails 11, 11a and 11b, and toothed or serrated rollers may be substituted for the smooth faced rollers 18. Such substitutions may be made where it is necessary or desirable to provide greater certainty in rotation of members 19 than is provided by the frictional contact of rollers 18 with rails 11, 11a and 11b.

Furthermore, in some instances, as when the articles are coated on the exterior, it may be desirable to prevent rotation of members 19. This may be accomplished by the simple expedient of removing the pins which attach the shafts 17 to members 18. When these pins are removed the rollers 18 will still rotate as before but the members 19 will not be rotated and will not rotate the articles carried thereby.

Other structural changes in the illustrated mechanism which are obvious to those skilled in the art and which do not involve invention may be made without departing from the scope of the present invention.

Having thus described the present invention so that others skilled in the art may be able to understand and practice the same, I state that what I desire to secure by Letters Patent is defined in what is claimed.

What is claimed is:

1. The combination of an endless, moving conveyor, cradles pivotally attached to said conveyor and including parallel, rotatable members for supporting cylindrical articles and rollers attached to said members, and stationary rails partially supporting said cradles and along which said rollers are rolled when the conveyor moves.

2. The combination of an endless, moving conveyor, cradles pivotally attached to said conveyor and including parallel, rotatable members for supporting and rotating cylindrical articles, and means for rotating said members including rollers connected thereto and stationary rails along which said rollers are rolled when the conveyor moves, said rails serving partially to support said cradles and cylindrical articles therein and to rotate said members.

3. The combination of an endless, moving conveyor, cradles pivotally attached to said conveyor and including parallel, rotatable members for supporting and rotating cylindrical articles, and means for rotating said members including rollers connected thereto and stationary rails along which said rollers are rolled when the conveyor moves, said rails serving partially to support said cradles, certain of said rails being disposed to pivot the cradles into self-unloading position.

4. The combination of an endless, moving conveyor composed of opposed parts, cradles for cylindrical articles disposed between and pivotally attached to said opposed parts of said conveyor, each said cradle comprising rotatable parallel members for rotatably supporting cylindrical articles and rollers connected to said members, and stationary rails frictionally engageable with said rollers and serving to rotate said rollers when the cradles are moved therealong by said conveyors, and also serving partially to support said cradles.

5. The combination of an endless, moving conveyor, cradles for cylindrical articles pivotally attached to said conveyor, each said cradle comprising parallel, cylindrical rotatable members and rollers connected to said members, and stationary rails parallel to said conveyor and disposed to engage and rotate said rollers and pivot the cradles when the conveyor moves the cradles, said rails also serving partially to support said cradles.

6. The combination of a heating chamber having inlet and outlet openings, a movable endless conveyor, wheels defining a course of travel for said conveyor thru said chamber and openings, rails parallel to said conveyor, and cradles for cylindrical articles pivotally attached to said conveyor, each said cradle comprising parallel, cylindrical, rotatable members and rollers connected to said members and disposed to run on said rails and to rotate said members when the conveyor moves the cradles, said rails serving to support part of the weight of the cradles and articles thereon.

7. The combination of a heating chamber having bottom inlet and outlet openings, rails within and along the sides of said chamber, opposed, movable, endless conveyors, wheels disposed within and without said chamber and defining a closed course of travel for said conveyors thru said openings, and cradles for cylindrical articles disposed between and pivoted to said conveyors, each said cradle comprising parallel, cylindrical rotatable members to support and rotate a cylindrical article thereon and rollers connected to said members to engage and be rotated by said rails when the cradles are moved therealong by said conveyors, said rails serving to support a considerable part of the weight of said cradles and members carried thereby in the heating chamber.

8. The combination of a heating chamber having bottom inlet and outlet openings, supporting rails within and along the sides of said chamber, opposed, moving endless conveyors, wheels disposed within and without said chamber and defining a closed course of travel for said conveyors, and carriers for cylindrical articles attached to said conveyors for propulsion, each said carrier comprising opposed connected brackets pivoted at their upper ends to the conveyors, parallel cylindrical article supporting members rotatable in said brackets, and rollers connected to the ends of each of said members and disposed to engage and be rotated by said supporting rails, the said rails within said chamber engaging all the rollers of carriers thereabove and also serving to support much of the weight of such carriers and the articles thereon.

FREDERICK R. SCHAEFER.